G. G. MALLETT.
HANDLE SECURING MEANS.
APPLICATION FILED SEPT. 6, 1918.
1,336,707.
Patented Apr. 13, 1920.
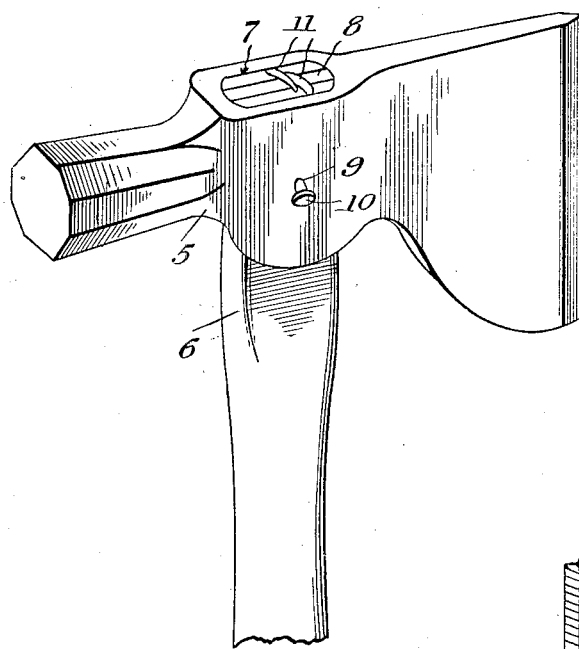
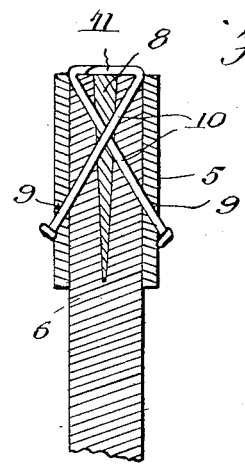
Witnesses
Everett L. Loyd Jr.
Inventor
G. G. Mallett
By Victor J. Evans
Attorneys

UNITED STATES PATENT OFFICE.

GERALD G. MALLETT, OF PRINCETON, ARKANSAS.

HANDLE-SECURING MEANS.

1,336,707.   Specification of Letters Patent.   Patented Apr. 13, 1920.

Application filed September 6, 1918. Serial No. 252,906.

*To all whom it may concern:*

Be it known that I, GERALD G. MALLETT, a citizen of the United States, residing at Princeton, in the county of Dallas and State of Arkansas, have invented new and useful Improvements in Handle-Securing Means, of which the following is a specification.

This invention has reference to a simple means for positively retaining an implement, such as a hammer head or the like, on the handle therefor.

An object of the invention is to provide a means for retaining a handle on an implement that shall comprise one or a plurality of bendable members that enter the bore or socket of the implement at an angle so that the same will contact with the wall of the bore opposite that which it enters and be thus directed to the outer end of the bore whereby the projecting end of the same may be bent angularly of the bore over the outer end of the handle.

The accompanying drawings illustrate a simple and satisfactory embodiment of the improvement reduced to practice, and in which:

Figure 1 is a perspective view of a handle secured to an implement in accordance with this invention.

Fig. 2 is a sectional view through the same in a line with the retaining means.

It is, of course, to be understood that my improvement may be employed in connection with any form of implement and the handle therefor, but for the sake of illustration I, in the accompanying drawings, have illustrated the same in connection with an ordinary hatchet.

The hatchet head is indicated by the numeral 5, and the bore or socket through which the end of the handle 6 passes is indicated by the numeral 7.

The handle may have its outer end kerfed in the usual manner to receive the usual wedge block 8.

From experience I have found that the wedge block frequently works loose and therefore does not function to hold the implement and handle properly connected. I have also found that in rural districts, especially where proper tools are not readily accessible, wedges, or instruments for making such wedges are hard to obtain. Around a farm or a suburban place nails and screws are generally purchased in such quantities that the farmer may easily lay his hands on the same, and with this knowledge I bore the hole angularly from the opposite sides of the head 5, each of the said holes entering the bore or socket 7 and being directed to the outer end of the socket. These holes or orifices are indicated in the drawings by the numerals 9. All of the instruments employed in accordance with this invention are provided with the orifices which may be made on the farm or which may be formed in the manufacture of such implements. If desired, the handle 6 may be provided with openings that register with the orifices 9 as may the wedge blocks 8, but these last mentioned means are not absolutely necessary in carrying out the invention, as a nail, screw or the like bendable element, indicated by the numeral 10, directed through the orifices, and forced through the handle and wedge block will contact with the wall of the bore or socket 7 opposite that which it enters, and by virtue of such contact will be directed outwardly. These projecting ends are bent in opposite directions over the outer end of the handle 6. The ends, if desired, may be bent by pliers or the like to provide each of the members 10 with a barb 11, and in flattening the outer ends of the said members 10 over the outer end of the handle the barbs 11 will be forced into the handle so that the handle and head are effectively secured together.

Having thus described the invention, what is claimed as new, is:

In combination, an implement having a socket and a handle having one of its ends received in the socket, the sides of the implement having outwardly directed angular orifices which communicate with the bore thereof, and bendable means passing through said orifices and through the portion of the handle in the socket of the implement, and designed to contact with the opposite walls of said socket to direct the same outward from the bore of the implement and to permit of the extensions thus provided being bent angularly over the outer end of the handle.

In testimony whereof I affix my signature.

GERALD G. MALLETT.